(12) United States Patent
Slapak et al.

(10) Patent No.: US 12,148,441 B2
(45) Date of Patent: Nov. 19, 2024

(54) SOURCE SEPARATION FOR AUTOMATIC SPEECH RECOGNITION (ASR)

(71) Applicant: Kardome Technology Ltd., Mazor (IL)

(72) Inventors: Alon Slapak, Mazor (IL); Dani Cherkassky, Mazor (IL)

(73) Assignee: KARDOME TECHNOLOGY LTD., Mazor (IL)

( * ) Notice: Subject to any disclaimer, the term of this patent is extended or adjusted under 35 U.S.C. 154(b) by 304 days.

(21) Appl. No.: 17/437,748

(22) PCT Filed: Mar. 10, 2019

(86) PCT No.: PCT/IB2019/051933
§ 371 (c)(1),
(2) Date: Sep. 9, 2021

(87) PCT Pub. No.: WO2020/183219
PCT Pub. Date: Sep. 17, 2020

(65) Prior Publication Data
US 2022/0148611 A1 May 12, 2022

(51) Int. Cl.
*G10L 21/0232* (2013.01)
*G10L 15/22* (2006.01)
(Continued)

(52) U.S. Cl.
CPC .......... *G10L 21/0232* (2013.01); *G10L 15/22* (2013.01); *G10L 21/0264* (2013.01);
(Continued)

(58) Field of Classification Search
CPC ......... G10L 15/20; G10L 15/22; G10L 25/18; G10L 25/21; G10L 25/84; G10L 21/0232;
(Continued)

(56) References Cited

U.S. PATENT DOCUMENTS 5,485,524 A * 1/1996 Kuusama ............... H03G 9/025
704/226
5,647,834 A 7/1997 Ron
(Continued)

FOREIGN PATENT DOCUMENTS

CN 103426434 A 12/2013
CN 104995679 A 10/2015
(Continued)

OTHER PUBLICATIONS

Extended Search Report for European Patent Application No. 19918690.9, mailed on Oct. 4, 2022, 9 pages.
(Continued)

*Primary Examiner* — Mohammad K Islam
(74) *Attorney, Agent, or Firm* — Shichrur & Co.

(57) ABSTRACT

A method for speech enhancement, the method may include receiving or generating sound samples that represent sound signals that were received during a given time period by an array of microphones; frequency transforming the sound samples to provide frequency-transformed samples; clustering the frequency-transformed samples to speakers to provide speaker related clusters, wherein the clustering is based on (i) spatial cues related to the received sound signals and (ii) acoustic cues related to the speakers; determining a relative transfer function for each speaker of the speakers to provide speakers related relative transfer functions; applying a multiple multiple output (MIMO) beamforming operation on the speakers related relative transfer functions to provide beamformed signals; and inverse-frequency transforming the beamformed signals to provide speech signals.

23 Claims, 9 Drawing Sheets

(51) Int. Cl.
  *G10L 21/0208* (2013.01)
  *G10L 21/0216* (2013.01)
  *G10L 21/0264* (2013.01)
(52) U.S. Cl.
  CPC ............ *G10L 2021/02087* (2013.01); *G10L 2021/02166* (2013.01)
(58) Field of Classification Search
  CPC ....... G10L 21/0264; G10L 2021/02166; G10L 2021/02087
  See application file for complete search history.

(56) References Cited

U.S. PATENT DOCUMENTS

| | | | |
|---|---|---|---|
| 5,774,837 A | 6/1998 | Yeldener et al. | |
| 6,593,956 B1 | 7/2003 | Potts et al. | |
| 7,076,433 B2 | 7/2006 | Ito et al. | |
| 7,197,456 B2* | 3/2007 | Haverinen | G10L 15/20 704/226 |
| 7,222,070 B1 | 5/2007 | Stachurski et al. | |
| 7,394,907 B2 | 7/2008 | Tashev | |
| 8,213,598 B2* | 7/2012 | Bendersky | H04B 3/23 379/406.13 |
| 8,239,052 B2 | 8/2012 | Itoyama et al. | |
| 8,271,279 B2* | 9/2012 | Hetherington | G10L 21/0216 704/211 |
| 8,750,491 B2* | 6/2014 | Prakash | H04M 9/082 379/406.05 |
| 8,798,992 B2* | 8/2014 | Gay | G10L 21/028 704/226 |
| 8,914,282 B2* | 12/2014 | Konchitsky | G10L 21/0208 704/226 |
| 8,949,120 B1* | 2/2015 | Every | G10L 21/0208 704/226 |
| 9,043,203 B2* | 5/2015 | Rettelbach | G10L 19/028 704/226 |
| 9,088,328 B2* | 7/2015 | Gunzelmann | H04B 1/1036 |
| 9,197,974 B1* | 11/2015 | Clark | H04R 29/004 |
| 9,202,463 B2* | 12/2015 | Newman | G10L 25/78 |
| 9,554,203 B1 | 1/2017 | Pavlidi et al. | |
| 9,560,446 B1 | 1/2017 | Chang et al. | |
| 9,583,088 B1 | 2/2017 | May et al. | |
| 9,613,612 B2* | 4/2017 | Perkmann | G10K 11/17861 |
| 9,640,179 B1* | 5/2017 | Hart | G10L 21/0208 |
| 9,653,060 B1* | 5/2017 | Hilmes | H04M 9/082 |
| 9,659,555 B1* | 5/2017 | Hilmes | H04R 3/005 |
| 9,792,897 B1* | 10/2017 | Kaskari | G10L 15/20 |
| 9,818,425 B1* | 11/2017 | Ayrapetian | G10L 21/0224 |
| 9,959,886 B2* | 5/2018 | Anhari | G10L 25/78 |
| 10,134,425 B1* | 11/2018 | Johnson, Jr. | G10L 25/87 |
| 10,192,567 B1* | 1/2019 | Kamdar | G10L 25/84 |
| 10,535,361 B2 | 1/2020 | Slapak | |
| 11,551,670 B1* | 1/2023 | Smith | G10L 15/063 |
| 2003/0103647 A1 | 6/2003 | Rui et al. | |
| 2004/0054527 A1 | 3/2004 | Quatieri, Jr. | |
| 2009/0012779 A1 | 1/2009 | Ikeda et al. | |
| 2009/0265169 A1* | 10/2009 | Dyba | G10L 19/012 704/E15.001 |
| 2009/0304203 A1 | 12/2009 | Haykin et al. | |
| 2010/0142327 A1 | 6/2010 | Kepesi et al. | |
| 2010/0145205 A1 | 6/2010 | Haghighi-Mood et al. | |
| 2011/0015924 A1 | 1/2011 | Gunel Hacihabiboglu et al. | |
| 2011/0039547 A1 | 2/2011 | van Rensburg et al. | |
| 2011/0182436 A1 | 7/2011 | Murgia et al. | |
| 2011/0282658 A1 | 11/2011 | Wang et al. | |
| 2011/0307251 A1 | 12/2011 | Tashev et al. | |
| 2013/0024194 A1 | 1/2013 | Zhao et al. | |
| 2013/0083832 A1* | 4/2013 | Sorensen | H04R 3/005 375/224 |
| 2013/0103382 A1 | 4/2013 | Kim et al. | |
| 2013/0185068 A1 | 7/2013 | Tanaka et al. | |
| 2013/0304459 A1 | 11/2013 | Pontoppidan et al. | |
| 2013/0317814 A1 | 11/2013 | Moriya et al. | |
| 2013/0332175 A1* | 12/2013 | Setiawan | G10L 19/012 704/500 |
| 2014/0195227 A1 | 7/2014 | Rudzicz et al. | |
| 2014/0214676 A1* | 7/2014 | Bukai | G10L 17/24 705/44 |
| 2014/0226838 A1 | 8/2014 | Wingate et al. | |
| 2015/0296319 A1 | 10/2015 | Shenoy et al. | |
| 2015/0302845 A1* | 10/2015 | Nakano | G10L 25/15 704/267 |
| 2015/0304766 A1 | 10/2015 | Delikaris-Manias et al. | |
| 2017/0208415 A1 | 7/2017 | Ojala | |
| 2018/0005633 A1 | 1/2018 | Bocklet et al. | |
| 2018/0033428 A1 | 2/2018 | Kim et al. | |
| 2018/0197559 A1* | 7/2018 | Orescanin | G10L 21/0232 |
| 2018/0262832 A1* | 9/2018 | Grosche | H04R 3/005 |
| 2018/0357995 A1* | 12/2018 | Lee | G10K 11/178 |
| 2019/0096419 A1* | 3/2019 | Giacobello | H04M 9/082 |
| 2019/0108837 A1* | 4/2019 | Christoph | G06F 3/165 |
| 2019/0115040 A1* | 4/2019 | Kamdar | G10L 21/0232 |
| 2019/0122686 A1 | 4/2019 | Slapak | |
| 2019/0222943 A1* | 7/2019 | Andersen | H04R 25/507 |
| 2019/0259381 A1* | 8/2019 | Ebenezer | H04R 3/005 |
| 2019/0318757 A1* | 10/2019 | Chen | G10L 19/022 |
| 2020/0058320 A1* | 2/2020 | Liu | G10L 15/22 |
| 2020/0243061 A1* | 7/2020 | Sun | G10K 11/17854 |
| 2021/0074282 A1* | 3/2021 | Borgstrom | G10L 25/84 |
| 2021/0350822 A1* | 11/2021 | Liu | H04R 3/04 |
| 2022/0059114 A1* | 2/2022 | Emanuel | G10L 21/0272 |
| 2022/0180882 A1* | 6/2022 | Wang | G06N 3/088 |
| 2022/0246161 A1* | 8/2022 | Verbeke | G06F 3/04847 |
| 2022/0248135 A1* | 8/2022 | Chen | H04S 3/004 |
| 2022/0270625 A1* | 8/2022 | Dai | G10L 21/02 |
| 2022/0286788 A1* | 9/2022 | Carlile | H04R 25/552 |
| 2023/0058427 A1* | 2/2023 | Pakarinen | G10K 11/17837 |

FOREIGN PATENT DOCUMENTS

| | | | | |
|---|---|---|---|---|
| CN | 107112006 A | | 8/2017 | |
| CN | 110120217 A | * | 8/2019 | ............ G10L 15/22 |
| CN | 112116920 A | * | 12/2020 | ........ G10L 21/0216 |
| EP | 3467819 A1 | * | 4/2019 | ............ G06F 3/165 |
| JP | 2008-064892 | | 3/2008 | |
| JP | 2008-203474 | | 9/2008 | |
| JP | 2013-201525 | | 10/2013 | |
| JP | 2022533300 A | | 7/2022 | |
| WO | 2006/059806 | | 6/2006 | |
| WO | WO-2006113350 A2 | * | 10/2006 | ......... G01L 15/063 |
| WO | 2007/028250 | | 3/2007 | |
| WO | 2015/157458 | | 10/2015 | |
| WO | 2018/022222 | | 2/2018 | |
| WO | WO-2023199136 A1 | * | 10/2023 | ............ A61B 5/0075 |

OTHER PUBLICATIONS

Sharon Gannot et al., "Signal Enhancement Using Beamforming and Nonstationarity with Applications to Speech", IEEE Transactions on Signal Processing, vol. 49, No. 8, Aug. 2001, pp. 1614-1626.

Office Action for Japanese Patent Application No. 2021-553756, mailed on Feb. 14, 2023, 6 pages.

Benesty et al., "On Microphone-Array Beamforming From a MIMO Acoustic Signal Processing Perspective", IEEE Transactions on Audio, Speech, and Language Processing, vol. 15, No. Mar. 3, 2007, pp. 1053-1065.

Webpage "The Unit Impulse Response" http://Ipsa.swarthmore.edu/Transient/TransInputs/TransImpulse.html, Jan. 29, 2016, 1 page.

Chowning, "The Synthesis of Complex Audio Spectra by Means of Frequency Modulation", Journal of the Audio Engineering Society, 1972. pp. 526-534.

Markovich et al., "Multichannel Eigenspace Beamforming in a Reverberant Noisy Environment With Multiple Interfering Speech Signals", IEEE Transactions on Audio, Speech, and Language Processing, vol. 17, No. 6, Aug. 2009. pp. 1071-1086.

Office Action for U.S. Appl. No. 15/787,706, mailed Apr. 12, 2019, 20 pages.

(56) References Cited

OTHER PUBLICATIONS

Notice of Allowance for U.S. Appl. No. 15/787,706, mailed on Sep. 11, 2019, 26 Pages.
Search Report and Written Opinion for PCT/IB2019/051933, mailed on Aug. 19, 2019, 11 pages.
International Preliminary Report on Patentability for PCT/IB2019/051933, mailed on Sep. 23, 2021, 8 pages.
Office Action for Chinese Patent Application No. 2019800962089, mailed Apr. 27, 2024, 14 pages.
Office Action for European Patent Application No. 19 918 690.9, mailed on May 2, 2024, 6 pages.

* cited by examiner

SOURCE SEPARATION FOR AUTOMATIC SPEECH RECOGNITION (ASR)

BACKGROUND

The performance of the speech enhancement modules depends upon the ability to filter out all the interference signals leaving only the desired speech signals. Interference signals might be, for example, other speakers, noise from air conditions, music, motor noise (e.g. in a car or airplane) and large crowd noise also known as 'cocktail party noise'. The performance of speech enhancement modules is normally measured by their ability to improve the speech-to-noise-ratio (SNR) or the speech-to-interference-ratio (SIR), which reflects the ratio (often in dB scale) of the power of the desired speech signal to the total power of the noise and of other interfering signals respectively.

There is a growing need to perform speech enhancement in a reverberant environment.

SUMMARY

There may be provided method for speech enhancement, the method may include: receiving or generating sound samples that represent sound signals that were received during a given time period by an array of microphones; frequency transforming the sound samples to provide frequency-transformed samples; clustering the frequency-transformed samples to speakers to provide speaker related clusters, wherein the clustering may be based on (i) spatial cues related to the received sound signals and (ii) acoustic cues related to the speakers; determining a relative transfer function for each speaker of the speakers to provide speakers related relative transfer functions; applying a multiple input multiple output (MIMO) beamforming operation on the speakers related relative transfer functions to provide beamformed signals; and inverse-frequency transforming the beamformed signals to provide speech signals.

The method may include generating the acoustic cues related to the speakers.

The generating of the acoustic cues may include searching for a keyword in the sound samples; and extracting the acoustic cues from the keyword.

The method may include extracting spatial cues related to the keyword.

The method may include using the spatial cures related to the keyword as a clustering seed.

The acoustic cues may include pitch frequency, pitch intensity, one or more pitch frequency harmonics, and intensity of the one or more pitch frequency harmonics.

The method may include associating a reliability attribute to each pitch and determining that a speaker that may be associated with the pitch may be silent when a reliability of the pitch falls below a predefined threshold.

The clustering may include processing the frequency-transformed samples to provide the acoustic cues and the spatial cues; tracking over time states of speakers using the acoustic cues; segmenting the spatial cues of each frequency component of the frequency-transformed signals to groups; and assigning to each group of frequency-transformed signals an acoustic cue related to a currently active speaker.

The assigning may include calculating, for each group of frequency-transformed signals, a cross-correlation between elements of equal-frequency lines of a time frequency map with elements that belong to other lines of the time frequency map and may be related to the group of frequency-transformed signals.

The tracking may include applying an extended Kalman filter.

The tracking may include applying multiple hypothesis tracking.

The tracking may include applying a particle filter.

The segmenting may include assigning a single frequency component related to a single time frame to a single speaker.

The method may include monitoring at least one monitored acoustic feature out of speech speed, speech intensity and emotional utterances.

The method may include feeding the at least one monitored acoustic feature to an extended Kalman filter.

The frequency-transformed samples may be arranged in multiple vectors, one vector per each microphone of the array of microphones; wherein the method may include calculating an intermediate vector by weight averaging the multiple vectors; and searching for acoustic cue candidates by ignoring elements of the intermediate vector that have a value that may be lower than a predefined threshold.

The method may include determining the predefined threshold to be three times a standard deviation of a noise.

There may be provided a non-transitory computer readable medium that stores instructions that once executed by a computerized system cause the computerized system to: receive or generate sound samples that represent sound signals that were received during a given time period by an array of microphones; frequency transform the sound samples to provide frequency-transformed samples; cluster the frequency-transformed samples to speakers to provide speaker related clusters, wherein the clustering may be based on (i) spatial cues related to the received sound signals and (ii) acoustic cues related to the speakers; determine a relative transfer function for each speaker of the speakers to provide speakers related relative transfer functions; apply a multiple input multiple output (MIMO) beamforming operation on the speakers related relative transfer functions to provide beamformed signals; inverse-frequency transform the beamformed signals to provide speech signals.

The non-transitory computer readable medium may store instructions for generating the acoustic cues related to the speakers.

The generating of the acoustic cues may include searching for a keyword in the sound samples; and extracting the acoustic cues from the keyword.

The generating of the acoustic cues may include searching for a keyword in the sound samples; and extracting the acoustic cues from the keyword.

The non-transitory computer readable medium may store instructions for extracting spatial cues related to the keyword.

The non-transitory computer readable medium may store instructions for using the spatial cures related to the keyword as a clustering seed.

The acoustic cues may include pitch frequency, pitch intensity, one or more pitch frequency harmonics, and intensity of the one or more pitch frequency harmonics.

The non-transitory computer readable medium may store instructions for associating a reliability attribute to each pitch and determining that a speaker that may be associated with the pitch may be silent when a reliability of the pitch falls below a predefined threshold.

The clustering may include processing the frequency-transformed samples to provide the acoustic cues and the spatial cues; tracking over time states of speakers using the acoustic cues; segmenting the spatial cues of each frequency component of the frequency-transformed signals to groups;

and assigning to each group of frequency-transformed signals an acoustic cue related to a currently active speaker.

The assigning may include calculating, for each group of frequency-transformed signals, a cross-correlation between elements of equal-frequency lines of a time frequency map with elements that belong to other lines of the time frequency map and may be related to the group of frequency-transformed signals.

The tracking may include applying an extended Kalman filter.

The tracking may include applying multiple hypothesis tracking.

The tracking may include applying a particle filter.

The segmenting may include assigning a single frequency component related to a single time frame to a single speaker.

The non-transitory computer readable medium may store instructions for monitoring at least one monitored acoustic feature out of speech speed, speech intensity and emotional utterances.

The non-transitory computer readable medium may store instructions for feeding the at least one monitored acoustic feature to an extended Kalman filter.

The frequency-transformed samples may be arranged in multiple vectors, one vector per each microphone of the array of microphones; wherein the non-transitory computer readable medium may store instructions for calculating an intermediate vector by weight averaging the multiple vectors; and searching for acoustic cue candidates by ignoring elements of the intermediate vector that have a value that may be lower than a predefined threshold.

The non-transitory computer readable medium may store instructions for determining the predefined threshold to be three times a standard deviation of a noise.

There may be provided a computerized system that may include an array of microphones, a memory unit and a processor. The processor may be configured to receive or generate sound samples that represent sound signals that were received during a given time period by an array of microphones; frequency transform the sound samples to provide frequency-transformed samples; cluster the frequency-transformed samples to speakers to provide speaker related clusters, wherein the clustering may be based on (i) spatial cues related to the received sound signals and (ii) acoustic cues related to the speakers; determine a relative transfer function for each speaker of the speakers to provide speakers related relative transfer functions; apply a multiple input multiple output (MIMO) beamforming operation on the speakers related relative transfer functions to provide beamformed signals; inverse-frequency transform the beamformed signals to provide speech signals; and wherein the memory unit may be configured to store at least one of the sound samples and the speech signals.

The computerized system may not include the array of microphones but may receive signals from the array of microphones that represent the sound signals that were received during the given time period by the array of microphones.

The processor may be configured to generate the acoustic cues related to the speakers.

The generating of the acoustic cues may include searching for a keyword in the sound samples; and
extracting the acoustic cues from the keyword.

The processor may be configured to extract spatial cues related to the keyword.

The processor may be configured to use the spatial cures related to the keyword as a clustering seed.

The acoustic cues may include pitch frequency, pitch intensity, one or more pitch frequency harmonics, and intensity of the one or more pitch frequency harmonics.

The processor may be configured to associate a reliability attribute to each pitch and determining that a speaker that may be associated with the pitch may be silent when a reliability of the pitch falls below a predefined threshold.

The processor may be configured to cluster by processing the frequency-transformed samples to provide the acoustic cues and the spatial cues; track over time states of speakers using the acoustic cues; segmenting the spatial cues of each frequency component of the frequency-transformed signals to groups; and assign to each group of frequency-transformed signals an acoustic cue related to a currently active speaker.

The processor may be configured to assign by calculating, for each group of frequency-transformed signals, a cross-correlation between elements of equal-frequency lines of a time frequency map with elements that belong to other lines of the time frequency map and may be related to the group of frequency-transformed signals.

The processor may be configured to track by applying an extended Kalman filter.

The processor may be configured to track by applying multiple hypothesis tracking.

The processor may be configured to track by applying a particle filter.

The processor may be configured to segment by assigning a single frequency component related to a single time frame to a single speaker.

The processor may be configured to monitor at least one monitored acoustic feature out of speech speed, speech intensity and emotional utterances.

The processor may be configured to feed the at least one monitored acoustic feature to an extended Kalman filter.

The frequency-transformed samples may be arranged in multiple vectors, one vector per each microphone of the array of microphones; wherein the processor may be configured to calculate an intermediate vector by weight averaging the multiple vectors; and search for acoustic cue candidates by ignoring elements of the intermediate vector that have a value that may be lower than a predefined threshold.

The processor may be configured to determine the predefined threshold to be three times a standard deviation of a noise.

BRIEF DESCRIPTION OF THE DRAWINGS

In order to understand the invention and to see how it may be carried out in practice, a preferred embodiment will now be described, by way of non-limiting example only, with reference to the accompanying drawings.

DETAILED DESCRIPTION OF THE DRAWINGS

Figure 1:
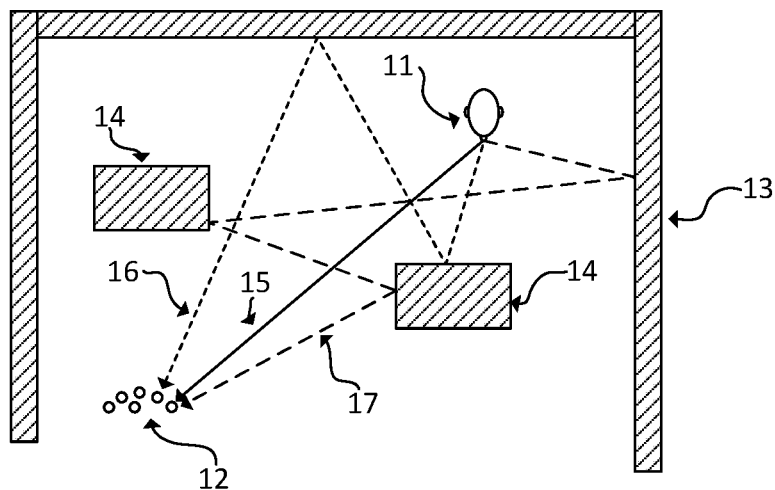
FIG. 1 illustrates multipath.

Any reference to a system should be applied, mutatis mutandis to a method that is executed by a system and/or to a non-transitory computer readable medium that stores instructions that once executed by the system will cause the system to execute the method.

Any reference to method should be applied, mutatis mutandis to a system that is configured to execute the method and/or to a non-transitory computer readable medium that stores instructions that once executed by the system will cause the system to execute the method.

Any reference to a non-transitory computer readable medium should be applied, mutatis mutandis to a method that is executed by a system and/or a system that is configured to execute the instructions stored in the non-transitory computer readable medium.

The term "and/or" is additionally or alternatively.

The term "system" means a computerized system.

Speech enhancement methods are focused on extracting a speech signal from a desired source (speaker) when the signal is interfered by noise and other speakers. In a free-filed environment, spatial filtering in the form of directional beamforming is effective. However, in a reverberant environment, the speech from each source is smeared across several directions, not necessarily successive, deteriorating the advantages of the ordinary beamformers. Using transfer-function (TF) based beamformers to address this issue, or using the relative transfer function (RTF) as the TF itself are a promising direction. However, in multi-speaker environments, the ability to estimate the RTF for each speaker, when the speech signals are captured simultaneously, is yet a challenge. There is provided a solution that involves tracking acoustic and spatial cues to cluster simultaneous speakers, thereby facilitating estimation of the RTF of the speakers in a reverberant environment.

There is provided a clustering algorithm of speakers which assigns each frequency component to its original speaker especially in multi-speaker reverberant environments. This provides the necessary condition for the RTF estimator to work properly in multi-speaker reverberant environments. The estimate of the RTFs matrix is then used to compute the weight vector of the transfer function based linear constrained minimum variance (TF-LCMV) beamformer (see Equation (10) in the sequel) and thus satisfies the necessary condition for TF-LCMV to work. It is assumed that each human speaker is endowed with a different pitch, so that the pitch is a bijective indicator to a speaker. Multi-pitch detection is known to be a challenging task especially in a noisy, reverberant multi-speaker environment. To address this challenge, the W-Disjoint Orthogonality (W-DO) assumption is employed, and a set of spatial cues, for example, signal intensity, azimuth angle and elevation angle, are used as additional features. The acoustical cues—pitch values—are tracked over time using extended Kalman filter (EKF) to overcome temporary inactive speakers and changes in pitch, and the spatial cues are used to segment the last L frequency components and to assign each frequency component to different sources. The result of the EKF and the segmentation is combined by means of cross-correlation to facilitate the clustering of the frequency components to a specific speaker with a specific pitch.

FIG. 1 describes the paths along which the frequency components of the speech signal travel from a human speaker 11 to the microhome array 12 in a reverberant environment. The walls 13 and other elements in the environment 14 reflect the impinging signal with attenuation and reflecting angle which depend on the material and the texture of the wall. Different frequency components of the human speech might take different paths. These might be a direct path 15 which reside on the shortest path between the human speaker 11 and the microphone array 12, or indirect paths 16, 17. Note that a frequency component might travel along one or more paths.

Figure 2:
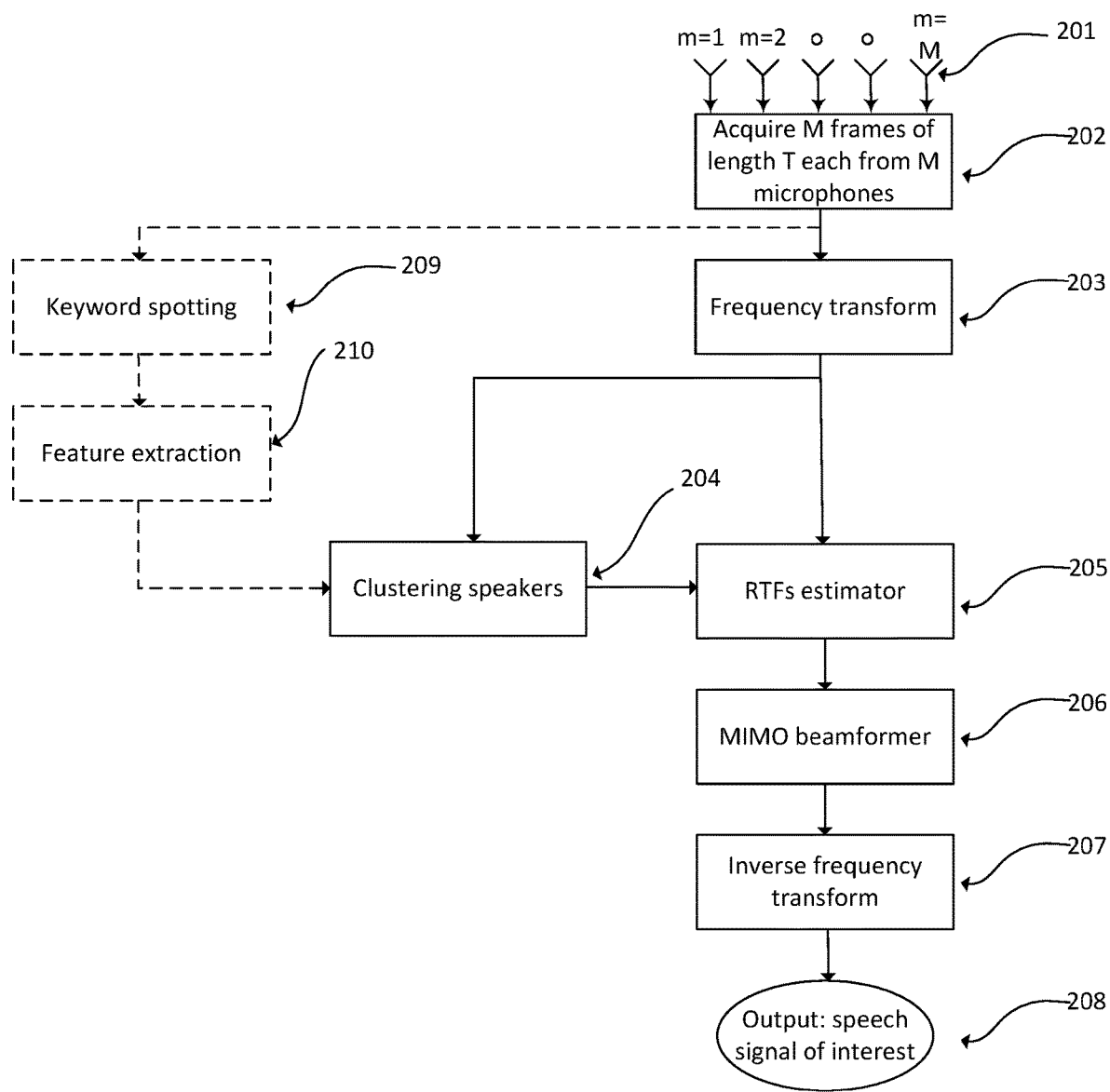
FIG. 2 illustrates an example of a method.

FIG. 2 describes the algorithm. The signals are acquired by the microphone array 201 which contains M≥2 microphones, where M=7 microphones is one example. The microphones can be deployed in a range of constellations such as equally-spaced on a straight line, on a circle or on a sphere, or even unevenly spaced forming arbitrary shape. The signal from each microphone is sampled, digitized, and stored in M frames, each contains T consecutive samples 202. The size of the frames T may be selected to be large enough such that the short-time Fourier transform (STFT) is accurate, but short enough so that the signal is stationary along the equivalent time duration. A typical value for T is 4,096 samples for sampling rate of 16 kHz, that is, the frame is equivalent to ¼ second. Often, consecutive frames overlap each other for improved tracking after the features of the signal over time. A typical overlap is 75%, that is, a new frame is initiated every 1,024 samples. T may, for example, range between 0.1 Sec-2 Sec—thereby providing 1024-32768 sampled for 16 kHz sampling rate. The samples are also referred to as sound samples that represent sound signals that were received by the array of microphones during period of time T.

Each frame is transformed in 203 to the frequency domain by applying Fourier transform or a variant of Fourier transform such as short time Fourier transform (STFT), constant-Q transform (CQT), logarithmic Fourier transform (LFT), filter bank and alike. Several techniques such as windowing and zero-padding might be applied to control the framing effect. The results of 203 is M complex-valued vectors of length K. If, for example, the array includes 7 microphones, 7 vectors are prepared which are registered by the frame time-index K is the number of frequency bins, and is determined by the frequency transform. For example, when using ordinary STFT, K=T which is the length of the buffer. The output of step 203 may be referred to as frequency-transformed signals.

The speech signals are clustered to different speakers in 204. The clusters may be referred to as speaker related clusters. Unlike prior art works which cluster speakers based on direction only, 204 deals with multi-speakers in a reverberant room, so that signals from different directions can be assigned to the same speaker due to the direct paths and the indirect paths. The proposed solution suggests using a set of acoustic cues, for example, the pitch frequency and intensity, and its harmonics frequencies and intensities, on top of a set of spatial cues, for example the direction (azimuth and elevation) and the intensity of the signal in one of the microphones. The pitch and one or more of the spatial cues are served as the state vector for a tracking algorithm such as Kalman filter and its variants, multiple hypothesis tracking (MHT) or particle filter, which are used to track this state vector, and to assign each track to a different speaker.

All these tracking algorithms use a model which describes the dynamics of the state vector in time, so that, when measurements of the state vector are missing or corrupted by noise, the tracking algorithm compensate for this using the dynamic model, and simultaneously updates the model parameters. The output of this stage is a vector, assigning each frequency component at a given time ℓ to each speaker. 204 is further elaborated in FIG. 3.

An RTF estimator is applied in 205 to the data in the frequency domain. The result of this stage is a set of RTFs each is registered to the associate speaker. The registration process, is done using the clustering array from the clustering speakers 204. The set of RTFs are also referred to as speakers related relative transfer functions.

The MIMO beamformer 206 reduces the energy of the noise and of the interfering signals with respect to the energy of the required speech signal by means of spatial filtering. The output of step 206 may be referred to as beamformed signals. The beamformed signals are then forwarded to the inverse frequency transform 207 to create a continuous speech signal in the form of a stream of samples, which is transferred, in turn, to other elements such as speech recognition, communication systems and recording devices 208.

In a preferred embodiment of the invention, a keyword spotting 209 can be used to improve the performance of the clustering block 204. The frames from 202 are searched for a pre-defined keyword (for example "hello Alexa", or "ok Google"). Once the keyword is spotted in the stream of frames, the acoustic cues of the speaker are extracted, such as the pitch frequency and intensity and its harmonics frequencies and intensities. Also, the features of the paths over which each frequency component has arrived at the microphone array 201, are extracted. These features are used by the clustering speaker 204 as a seed for the cluster of the desired speaker. Seed is an initial guess as to the initial parameters of the cluster. For example, the cluster's centroid, radius and statistics for centroid-based clustering algorithms such as K-means, PSO and 2KPM. Another example is the bases of the subspace for subspace-based clustering.

Figure 3:
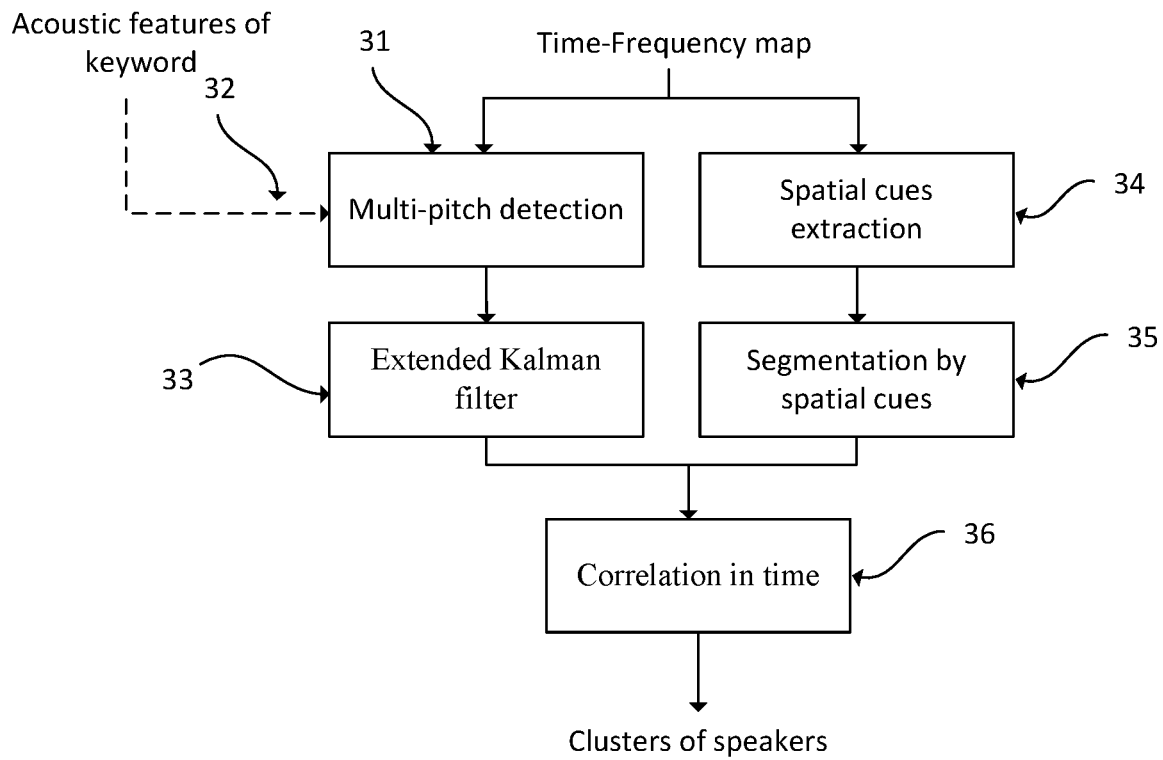
FIG. 3 illustrates an example of a clustering step of the method of FIG. 2.

FIG. 3 describes the clustering algorithm of speakers. It is assumed that each speaker is endowed with a different set of acoustic cues, for example, pitch frequency and intensity and its harmonics frequencies and intensities, so that the set of acoustic cues is a bijective indicator to a speaker. Acoustic cues detection is known to be a challenging task especially in a noisy, reverberant multi-speaker environment. To address this challenge, the spatial cues, for example, in the form of the signal intensity, the azimuth angle and the elevation angle are used. The acoustical cues are tracked over time using filters such as particle filter and extended Kalman filter (EKF) to overcome temporary inactive speakers and changes in acoustic cues, and the spatial cues are used to segment the frequency components among different sources. The result of the EKF and the segmentation is combined by means of cross-correlation to facilitate the clustering of the frequency components to a specific speaker with a specific pitch.

In 31 potential acoustic cues in the form of pitch frequencies are detected as an example of one preferred embodiment. First, a time-frequency map is prepared using the frequency transform of the buffers from each microphone, which are computed in 203. Next, the absolute value of each of the M K-long complex-valued vectors are weight-averaged, with some weight factors which can be determined so as to diminish artifacts in some of the microphones. The result is a single K-long real vector. In this vector, values higher than a given threshold μ are extracted, while the rest of the elements are discarded. The threshold μ is often selected adaptively as being three times the standard deviation of the noise, but no less than a constant value which depends on the electrical parameters of the system, and especially on the number of effective bits of the sampled signal. Values with frequency index within the range of [k_min, k_max] are defined as candidates for pitch frequencies. Variable k_min and k_max are typically 85 Hz and 2550 Hz respectively, as typical adult male will have a fundamental frequency from 85 to 1800 Hz, and that of a typical adult female from 165 to 2550 Hz. Each pitch candidate is then verified by searching for its higher harmonics. The existence of the $2^{nd}$ and $3^{rd}$ harmonics may be a prerequisite for a candidate pitch to be detected as a legitimate pitch with reliability R (say, R=10). If higher harmonics (e.g., 4th and 5th) exist, the reliability of the pitch may be increased—for example doubled for each harmonic. An example can be found in FIG. 4. In a preferred embodiment of the invention, the pitch of the desired speaker 32 is supplied by 210 using a keyword that was uttered by the desired speaker. The supplied pitch 32 is added to the list with the highest possible reliability, say R=1000.

In 33, an extended Kalman filter (EKF) is applied to the pitch from 31. As noted by the Wikipedia entry on extended Kalman filters (www.wikipedia.org/wiki/Extended_Kalman_filter), a Kalman filter has a state transition equation and an observation model. The state transition equation, for a discrete calculation, is:

$$x_k = f(x_{k-1}, u_k) + w_k \quad (1)$$

And the observation model, for a discrete calculation, is:

$$z_k = h(x_k) + v_k \quad (2)$$

where $x_k$ is the state vector which contains parameters which (partially) describe the status of a system, $u_k$ is a vector of external inputs which provide information on the status the system, $w_k$ and $v_k$ are the process and observation noises. Time updater of the extended Kalman filter may predict the next state with prediction equations and detected pitch may update the variables by comparing the actual measurement with the predicted measurement, using the following type of equation:

$$y_k = z_k - h(x_{k|k+1}) \quad (3)$$

where $z_k$ is the detected pitch and $y_k$ is the error between the measurement and the predicted pitch.

In 33, each trajectory may begin from a detected pitch, followed by a model $f(x_k, u_k)$, reflecting the temporal behavior of the pitch, which might go higher or lower because of emotions. The model's inputs may be past state vectors $x_k$ (either one state vector or more), and any external inputs $u_k$ which affect the dynamics of the pitch, such as the speed of the speech, intensity of speech and emotional utterances. The elements of the state vector x may quantitatively describe the pitch. For example, a state vector of a pitch might include, inter alia, the pitch frequency, the intensity of the 1st order harmonics, and the frequency and intensity of higher harmonics. The vector function $f(x_k, u_k)$ may be used to predict the state-vector x at some given time k+1 ahead of the current time. An exemplary realization of the dynamic model in the EKF may include the time update equation (a.k.a. prediction equation) as is described in the book "Lessons in Digital Estimation Theory" by Jerry M. Mendel, which is incorporated herein by reference.

Considering, for example, the 3-tuple state-vector:

$$x_k = [f_k a_k b_k]^T \in \mathbb{R}^3 \quad (4)$$

where $f_k$ is the frequency of the pitch (1st harmonic) at time k, $a_k$ is the intensity of the pitch ($1^{st}$ harmonic) at time k, and $b_k$ is the intensity of the $2^{nd}$ harmonic at time k.

An exemplary state-vector model for the pitch may be:

$$x_k = x_{k-1} \in \mathbb{R}^4 \quad (5)$$

Which describes a model which assumes a constant pitch at all time. In a preferred embodiment of the invention, the speed of the speech, intensity of speech and emotional utterances using speech recognition algorithms as are known in the art, are monitored continuously, providing external inputs $u_k$ which improves the time update stage of the EKF. Emotional utterance methods are known in the art. See, for example "New Features for Emotional Speech Recognition" by Palo et. al.

Each track is endowed with reliability field which is inversely proportional to the time over which the track evolves using the time update only. When the reliability of a track goes below some reliability threshold p, say, representing 10 seconds of undetected pitch, the track is defined as dead, which means that the respective speaker is not active. On the other hand, when a new measurement (pitch detection) appears, which cannot be assigned to any of the existing tracks, a new track is initiated.

In 34, the spatial cues are extracted from the M frequency-transformed frames. As in 31, the recent L vectors are saved for analysis using correlation in time. The result is a time-frequency-Cue (TFC) map, which is a 3-dimensional array of size L×K×P (where P=M−1) for each of the M microphones. The TFC is described in FIG. 5.

In 35, the spatial cues of each frequency component in the TFC are segmented. The idea is that along the L frames, a frequency component might originate from different speakers, and this can be observed by comparing the spatial cues. It is assumed, however, that at a single frame time 1, the frequency component originates from a single speaker, owing to the W-DO assumption. The segmentation can be performed using any known method in the literature which is used for clustering such as K nearest neighbors (KNN). The clustering assigns an index c $(k,l) \in \mathbb{N}$ to each cell in A, which indicates to which cluster the cell (k,l) belongs.

In 36, the frequency components of the signals are grouped such that each frequency component is assigned to a specific pitch in the list of pitches which are tracked by the EKF and is active by its reliability. This is done by computing the sample-cross-correlation between the $k^{th}$ line of the time-frequency map (see FIG. 4), which is assigned to one of the pitches, with all the values with a specific cluster index $$c_0(j, l)$$

in other lines in the time-frequency map. This is done for every cluster index. The sample cross-correlation is given by:

$$R(k, j, c_0) = \frac{1}{L} \sum_{\substack{l=0 \\ c(j,l)=c_0}}^{L-1} A(k, l) \cdot A(j, l) \quad (6)$$

Where A is the time-frequency map, k is the index of the line belonging to one of the pitches, j is any other line of A and L is the number of columns of A. After computing the sample cross-correlation between each pitch and each of the clusters in other lines, the cluster $c_1$ in line $j_1$ with the highest cross-correlation is grouped with the respective pitch, and then the cluster $c_2$ in line $j_2$ with the second highest cross-correlation is grouped with the respective pitch, and so forth. This process is repeated until the sample-cross correlation goes below some threshold which can be set adaptively as, say, 0.5×(the average energy of the signal at a single frequency). The result of 35 is a set of groups of frequencies endowed with the respective pitch frequency.

Figure 4:
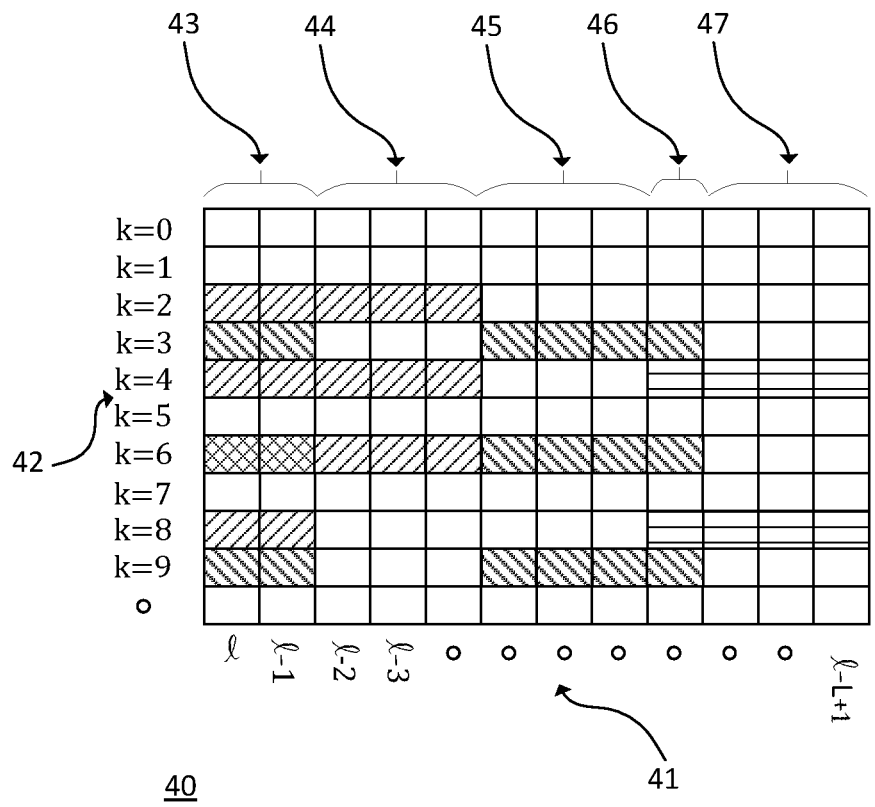
FIG. 4 illustrates an example of a pitch detection over a time-frequency map.

FIG. 4 describes an example of the pitch detection over the time-frequency map. 41 is the time axis, which is denoted by the parameter $\ell$, and 42 is the frequency axis which is described by the parameter k. Each column in this 2-dimensional array is the K-long real valued vector extracted in 31 after averaging the absolute value of the M frequency transformed buffers at time $\ell$. For the correlation analysis in time, the L recent vectors are saved in a 2 dimensional array of size K×L. In 43 two pitches are denoted by diagonal lines at different directions. The pitch k=2 with its harmonics at k=4,6,8, has reliability R=20 because of the existence of the 4th harmonics, and the pitch at k=3 with its harmonics at k=6,9 has reliability R=10. In 44 the k=3 pitch is inactive, and only k=2 is active. However, the reliability of the k=2 pitch is decreased to R=10 as the 4th harmonics is not detected (below the threshold μ). In 45 the pitch of k=3 is active again and the k=2 is inactive. In 46 a new pitch candidate at k=4 is emerged, but only its $2^{nd}$ harmonic is detected. Therefore, it is not detected is a pitch. In 47 the k=3 pitch is inactive no pitch is detected.

Figure 5:
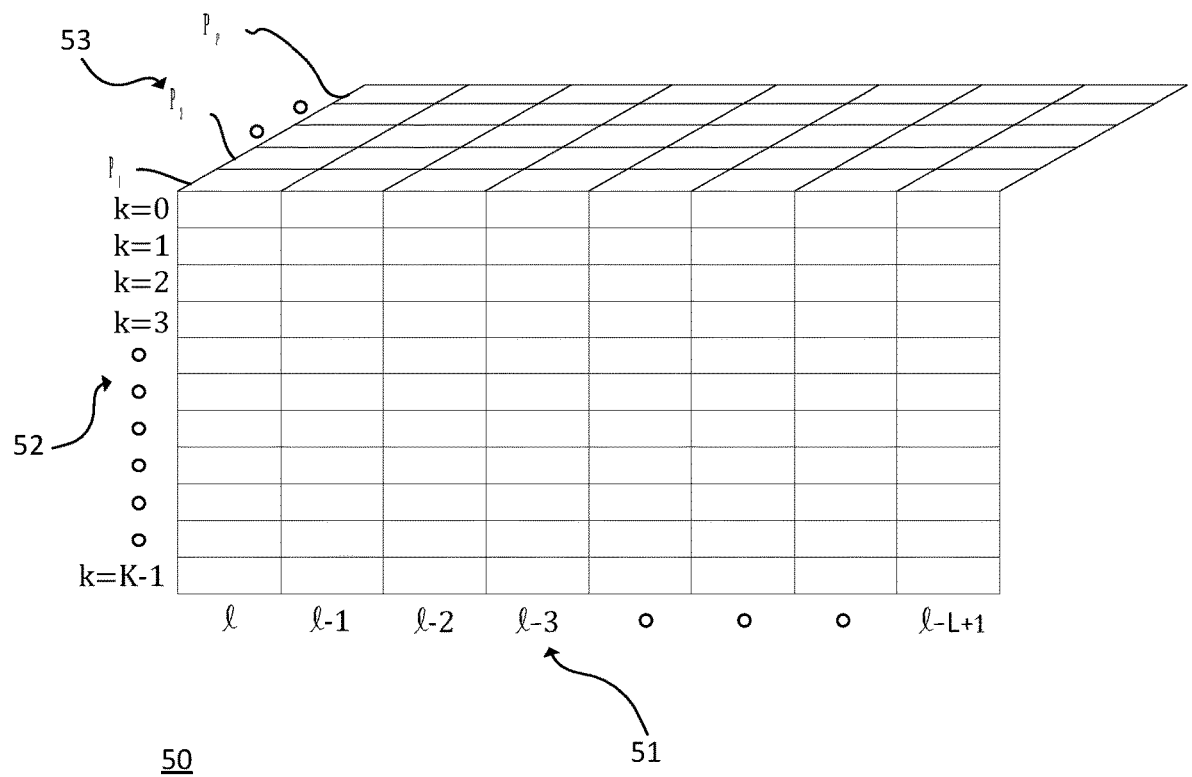
FIG. 5 illustrates an example of a time-frequency-Cue map.

FIG. 5 describes the TFC-map, whose axes are the frame index (time) 51, the frequency component 52 and the spatial cues 53, which might be, for example, a complex value expressing the direction (azimuth and elevation) from which each frequency component arrives, and the intensity of the component. When the frames with index $\ell$ are processed and transferred to the frequency domain, a vector of M complex number is received for each frequency element $\{k\}_{k=0}^{K-1}$. From each vector, up to M−1 spatial cues are extracted. In the example of direction and intensity of each frequency component, this might be done using any direction-finding algorithm for array processing which is known in the art such as MUSIC or ESPRIT. The result of this algorithm is a set of up to M−1 directions in 3-dimensional space, each is expressed by two angles and the estimated intensity of the arriving signal $p_p$ ($\ell$, k) ≜ (a ($\ell$, k), θ($\ell$, k), ϕ($\ell$, k))$_p$, p=1, . . . , P≤M−1. The cues are arranged in the TFC-map such that $p_{p_0}(\ell_0, k_0)$ at the cell indexed by $l_0$, $k_0$, $p_0$.

Appendix

The performance of the speech enhancement modules depends upon the ability to filter out all the interference signals leaving only the desired speech signals. Interference signals might be, for example, other speakers, noise from air conditions, music, motor noise (e.g. in a car or airplane) and large crowd noise also known as 'cocktail party noise'. The performance of speech enhancement modules is normally measured by their ability to improve the speech-to-noise-ratio (SNR) or the speech-to-interference-ratio (SIR), which reflects the ratio (often in dB scale) of the power of the desired speech signal to the total power of the noise and of other interfering signals respectively.

When the acquisition module contains a single microphone, the methods are termed single-microphone speech enhancement and are often based on the statistical features of the signal itself in the time-frequency domain such as single channel spectral subtraction, spectral estimation using minimum variance distortionless response (MVDR) and echo-cancelation. When more than a single microphone is used, the acquisition module is often termed microphone array, and the methods—multi-microphone speech enhancement. Many of these methods exploit the differences between the signals captured simultaneously by the microphones. A well-established method is the beamforming which sums-up the signals from the microphones after multiplying each signal by a weighting factor. The objective of the weighting factors is to average out the interference signals so as to condition the signal of interest.

Beamforming, in other words, is a way of creating a spatial filter which algorithmically increases the power of a signal emitted from a given location in space (the desired signal from the desired speaker), and decreases the power of signals emitted from other locations in space (interfering signals from other sources), thereby increasing the SIR at the beamformer output.

Delay-and-sum beamformer (DSB) involve using weighting factors of a DSB are composed of the counter delays implied by the different ways along which the desired signal travels from its source to each of the microphones in the array. DSB is limited to signals which come from a single direction each, such as in free-field environments. Consequently, in reverberant environments, in which signals from the same sources travel along different ways to the microphones and arrive at the microphone from a plurality of directions, DSB performance is typically insufficient.

To mitigate the drawbacks of DSB in reverberant environments, beamformers may use more complicated acoustic transfer function (ATF), which represents the direction (azimuth and elevation) from which each frequency component arrives at a specific microphone from a given source. A single direction of arrival (DOA), which is assumed by DSB and other DOA based methods, often doesn't hold true in reverberant environments, where the components of the same speech signal arrive from different directions. This is because of the different frequency response of physical elements in a reverberant environment such as walls, furniture, and peoples. The ATF in the frequency domain is a vector assigning a complex number to each frequency in the Nyquist bandwidth. The absolute value represents the gain of the path related to this frequency, and the phase indicates the phase which is added to the frequency component along the path.

Estimating the ATF between a given point in space and a given microphone may be done by means of using a loudspeaker positioned at the given point and emitting a known signal. Taking simultaneously the signals from the input of the speaker and the output of the microphone one can readily estimate the ATF. The loudspeaker may be situated at one or more positions where human speakers might reside during the operation of the system. This method creates a map of ATFs for each point in space, or more practically, for each point on a grid. ATFs of points not included in the grid are approximated using interpolation. Nevertheless—this method suffers from major drawbacks. First, the need to calibrate the system for each installation making this method impractical. Second, the acoustic difference between human speaker and an electronic speaker, which deviates the measured ATF from the actual one. Third, the complexity of measuring a huge number of ATFs, especially when considering also the direction of the speaker, and forth, possible errors due to changes of the environment.

A more practical alternative to the ATF is the relative transfer function (RTF) as a remedy for the disadvantages of ATF estimation methods in practical applications. The RTF is the difference between the ATFs between a given source to two of the microphones in the array, which, in the frequency domain takes the form of the ratio between the spectral representation of the two ATFs. Like the ATF, the RTF in the frequency domain assigns a complex number to each frequency. The absolute value is the gain difference between the two microphones, which is often close to unity when the microphones are close to each other, and the phase, under some conditions, reflects the incident angle of the source.

Transfer function based linear constrained minimum variance (TF-LCMV) beamformer may reduce noise while limiting speech distortion, in multi-microphone applications, by minimizing the output energy subject to the constraint that the speech component in the output signal is equal to the speech component in one of the microphone signals. Given $N=N_d+N_i$ sources, consider the problem of extracting $N_d$ desired speech sources, contaminated by $N_i$ interfering sources, and a stationary noise. Each of the involved signals propagates through the acoustic medium before being picked by an arbitrary array comprising M microphones. The signal of each microphone is segmented to frames of length T and FFT is applied to each frame. In the frequency domain, let us denote the k-th frequency component of the $\ell$-th frame of the m-th microphone and the n-th source by $z_m(\ell,k) \in \mathbb{C}$, and $s_n(\ell,k) \in \mathbb{C}$, respectively. Similarly, the ATF between the n-th source and the m-th microphone is $g_{m,n}(\ell,k)$, and the noise at the m-th microphone is $v_m(\ell,k)$. The received signal in a matrix form is given by:

$$z(\ell,k)=G(\ell,k)s(\ell,k)+v(\ell,k) \in \mathbb{C}^M \qquad (7)$$

Where $z(\ell,k)=[z_1(\ell,k), \ldots, z_m(\ell,k)]^T \in \mathbb{C}^M$ is the sensor vector, $s(\ell,k)=[s_1(\ell,k), \ldots, s_N(\ell,k)]^T \in \mathbb{C}^N$ is the sources vector, $G(\ell,k) \in \mathbb{C}^{M \times N}$ is the ATFs matrix such that $[G(\ell,k)]_{m,n}=g_{m,n}(\ell,k) \in \mathbb{C}$, and $v(\ell,k)=[v_1(\ell,k), \ldots, v_M(\ell,k)]^T \in \mathbb{C}^M$ is an additive stationary noise, uncorrelated with any of the sources. Equivalently, (7) can be formulated using the RTFs. Without loss of generality, the RTF of the n-th speech source $h_{m,n}(\ell,k) \in \mathbb{C}$ can be defined as the ratio between the n-th speech components at the m-th microphone, and its respective component at the first microphone, i.e., $h_{m,n}(\ell,k)=g_{m,n}(\ell,k)/g_{1,n}(\ell,k)$. The signal in (7) can be formulated using the RTFs matrix $H(\ell,k) \in \ell^{M \times N}$, such that $[H(\ell,k)]_{m,n}=h_{m,n}(\ell,k) \in \mathbb{C}$, in a vector notation:

$$z(\ell,k)=H(\ell,k)x(\ell,k)+v(\ell,k) \in \mathbb{C}^M \qquad (8)$$

Where $x_n(\ell,k)=g_{1,n}(\ell,k)s_n(\ell,k) \in \mathbb{C}$ is the altered source signal.

There is a need to estimate the mixture of the $N_d$ desired sources, given the array measurements $z(\ell,k)$. The extraction of the desired signals can be accomplished by applying a beamformer $w(\ell,k) \in \mathbb{C}^M$ to the microphone signals $y(\ell,k) = w^H(\ell,k)z(\ell,k) \in \mathbb{C}$. Assuming $M \geq N$, $w(\ell,k) \in \mathbb{C}^M$ can be chosen to satisfy the LCMV criterion:

$$w(\ell, k) = \underset{w}{\operatorname{argmin}}\{w^H(\ell, k)\Phi_{vv}(\ell, k)w(\ell, k)\} \quad (9)$$

$$\text{s.t } H^H(\ell, k)w(\ell, k) = c(\ell, k)$$

where $\Phi_{vv}(\ell,k) \in \mathbb{C}^{M \times M}$ is the power spectral density (PSD) matrix of $v(\ell,k)$ and $c(\ell,k) \in \mathbb{C}^{N \times 1}$ is the constraint vector.

A possible solution to (9) is:

$$w_{LCMV}(\ell,k) = \Phi_{vv}^{-1}(\ell,k)H(\ell,k)(H^H(\ell,k)\Phi_{vv}^{-1}(\ell,k)H(\ell,k))^{-1}c(\ell,k) \quad (10)$$

Based on (7) an (8) and the constrains set, the components of the desired signals at the beamformer output is given by $d(\ell,k) = c^H(\ell,k)x(\ell,k) \in C$, that is, the output of the beamformer is a mixture of the components of the desired signals as measured by the first (reference) microphone.

From the $\ell$-th set of RTFs and for each frequency component k, a set of up to M−1 source, with incident angles $\theta_p(\ell,k)$, $p=1$, $P \leq M-1$, and the elevation angles $\phi_p(\ell, k)$ can be extracted using, for example, phase-difference based algorithms, together with the intensity $a_p(\ell,k)$ taken from one of the microphones which is defined as the reference one. These 3-tuples $p_p(\ell,k) \triangleq (a(\ell,k), \theta(\ell,k), \phi(\ell, k))_p \in \mathbb{R}^3$ are often called spatial cues.

The TF-LCMV is an applicable method for extracting M−1 speech source impinging an array comprising of M sensors from different locations in a reverberant environment. However, a necessary condition for the TF-LCMV to work is that the RTFs matrix H ($\ell$,k) whose columns are the RTF vectors of all the active sources in the environment is known and available to the TF-LCMV. This needs association of each frequency component to its source speaker.

Several methods may be used to assign sources to signals without supplementary information. Major family of methods is termed blind source separation (BSS) which recovers unknown signals or sources from their observed mixtures. The key weakness of BSS in the frequency domain is that at each frequency, the column vectors of the mixing matrix (estimated by BSS) are permuted randomly, and without knowledge of this random permutation, combining results across frequencies becomes difficult as disclosed.

BSS may be assisted by the pitch information. However, the gender of the speakers is required a-priory.

BSS may be used in the frequency domain, while resolving the ambiguity of the estimated mixing matrix using the maximum-magnitude method, which assigns a specific column of the mixing matrix to the source corresponds to the maximal element in the vector. Nevertheless—this method depends heavily on the spectral distributions of the sources as it is assumed that the strongest component at each frequency indeed belongs to the strongest source. However, this condition is not often met, as different speakers might introduce intensity peaks at different frequencies. Alternatively, source activity detection may be used, also known as voice activity detection (VAD), such that the information on the active source at a specific time is used to resolve the ambiguity in the mixing matrix. The drawback of VAD is that the voice-pause cannot be robustly detected, especially in a multi-speaker environment. Also, this method is effective only when no more than a single speaker at a time join to the conversation, requires a relatively long training period, and is sensitive to motion during this period.

The TF-LCMV beamformer may be used as well as its extended version for binaural speech enhancement system, together with a binaural cues generator. The acoustic cues are used to segregate speech components from noise components in the input signals. The technique is based on the auditory scene analysis theory[1], which suggest the use of distinctive perceptual cues to cluster signals from distinct speech sources in a "cocktail party" environment. Examples of primitive grouping cues that may be used for speech segregation include common onsets/offsets across frequency bands, pitch (fundamental frequency), same location in space, temporal and spectral modulation, pitch and energy continuity and smoothness. However, the underlying assumption of this method is that all the components of the desired speech signals have almost the same direction. That is, almost free-field conditions, saving the effect of the head-shadow effect, which is suggested to being compensated for by using head related transfer functions. This is unlikely to happen in a reverberant environment.

It should be noted that even when multiple speakers are active simultaneously, the spectral contents of the speakers do not overlap at most of the time-frequency points. This is called W-Disjoint Orthogonality, or briefly W-DO. This can be justified by the sparseness of speech signal in time-frequency domain According to this sparseness, the probability of the simultaneous activity of two speakers in a specific time-frequency point is very low. In other words, in the case of multiple simultaneous speakers, each time-frequency point most likely corresponds to spectral content of one of speakers.

W-DO may be used to facilitate BSS by defining a specific class of signals which are W-DO to some extent. This may use only the first order statistics is needed, which is computationally economic. Furthermore, an arbitrary number of signal sources can be de-mixed using only two microphones, provided that the sources are W-DO and do not occupy the same spatial positions. However, this method assumes an identical underlying mixing matrix across all frequencies. This assumption is essential for using histograms of the estimated mixing coefficients across different frequencies. However, this assumption often does not hold true in a reverberant environment, but only in free-field. The extension of this method to the case of multipath is restricted to either negligible energy from the multipath, or to sufficiently smooth convolutive mixing filters so that the histogram is smeared, yet maintaining a single peak. This assumption too does not hold true in reverberant environments in which the difference between different paths is often too large to create a smooth histogram.

It has been found that the suggested solution performs in reverberant environments and does not have to rely on unnecessary assumptions and constraints. The solution may operate even without a-priory information, even without a large training process, even without constraining estimations of the attenuation and the delay of a given source at each frequency to a single point in the attenuation-delay space, even without constraining estimated values of the attenuation-delay values of a single source to create a single cluster, and even without limiting the number of mixed sounds to two.

Source Separation to Speech Recognition Engine

Voice user interface (VUI) is an interface between human speakers and a machine. The VUI receives the speech signal using one or more microphones and converts the speech signal into a digital signature, often by transcribing the speech signal into text, which is used to infer the intention of the speaker. The machine can then response to the intention of the speaker based on the application the machine is designed for.

The key component of VUI is the automatic speech recognition engine (ASR) which converts the digitized speech signal into text. The performance of ASRs, that is, how accurately the text describes the acoustic speech signal, depends heavily on the matching of the input signal to the requirements of the ASR. Therefore, other components of VUI are designed to enhance the acquired speech signal before feeding it to the ASR. Such components may be noise suppression, echo cancellation and source separation to name but a few.

One of the critical components in speech enhancing is the source separation (SS) which is intended for separating speech signals arriving from several sources. Assuming an array of two or more microphones, a signal, acquired by each of the microphones, is a mixture of all the speech signals in the environment plus other interferences such as noise and music. The SS algorithm takes the mixed signals from all the microphones and decomposes them to their components. That is, the output of the source separation is a set of signals, each represents the signal of a specific source, be it a speech signal from a specific speaker, music or even the noise.

There is a growing need to improve source separation.

Figure 6:
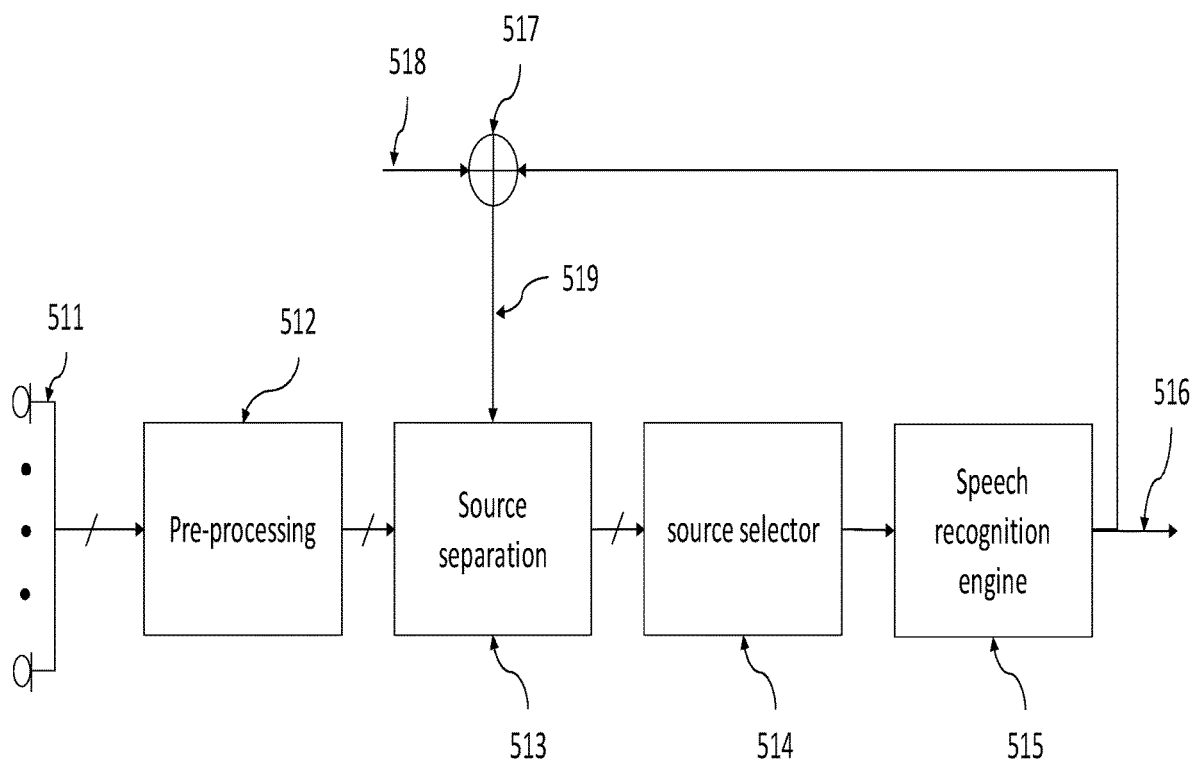
FIG. 6 illustrates an example of a voice recognition chain in offline training.

FIG. 6 illustrates an example of a voice recognition chain in offline training. The chain often includes an array of microphones 511, which provides a set of digitized acoustic signals. The number of digitized acoustic signals is equal to the number of microphones composing the array 511. Each digitized acoustic signal contains a mixture of all the acoustic sources in the vicinity of the array of microphones 511, be it human speakers, synthetic speakers such as TV, music and noise. The digitized acoustic signals are delivered to a pre-processing stage 512. The aim of the pre-processing stage 512 is to improve the quality of the digitized acoustic signals by removing interferences such as echo, reverberation and noise. The pre-processing stage 512 is usually performed using multichannel algorithms that employ statistical association between the digitized acoustic signals. The output of the pre-processing stage 512 is a set of processed signals, usually with the same number of signals as the number of the digitalized acoustic signals at the input to this stage. The set of processed signals is forwarded to the source separation (SS) stage 513 which aims at extracting the acoustic signals from each source in the vicinity of the array of microphones. In other words, the SS stage 513 takes a set of signals, each is a different mixture of the acoustic signals received from different sources and creates a set of signals such that each signal contains mainly a single acoustic signal from a single specific source. Source separation of speech signals may be performed using geometric considerations of the deployment of the sources such as beamforming or by considering the characteristics of the speech signal such as independent component analysis. The number of the separated signals is usually equal to the number of active sources in the vicinity of the array of microphones 511, but smaller than the number of microphones. The set of separated signals is forwarded to the source selector 514. The aim of the source selector is to select the relevant source of speech whose speech signal should be recognized. The source selector 514 may use a trigger word detector such that the source which pronounces a pre-defined trigger word is selected. Alternatively, the source selector 514 may consider the position of the source in the vicinity of the array of microphones 511 such as a predefined direction with respect to the array of microphones 511. Also, the source selector 514 may use a predefined acoustical signature of the speech signal to select the source which matches with this signature. The output of the source selector 514 is a single speech signal which is forwarded to the speech recognition engine 515. The speech recognition engine 515 converts the digitized speech signal into text. There are many methods for speech recognitions known in the art, most of them are based on extracting features from the speech signal and comparing these features with a predefined vocabulary. The primary output of the speech recognition engine 515 is a text string 516 which is associated with the input speech signal. A predefined text 518 is pronounced to the microphones in the offline training. The error 519 is computed by comparing the output of the ASR 516 to this text. The comparison 517 can be performed using a simple word-counting or more sophisticated comparison methods which consider the meaning of the words and appropriately weights mis-detections of different word. The error 519 is then used by the SS 513 to modify the set of parameters to find the values which minimize the error. This can be done by any supervised estimation or optimization method such as least squares, stochastic gradient, neural network (NN) and its variants.

Figure 7:
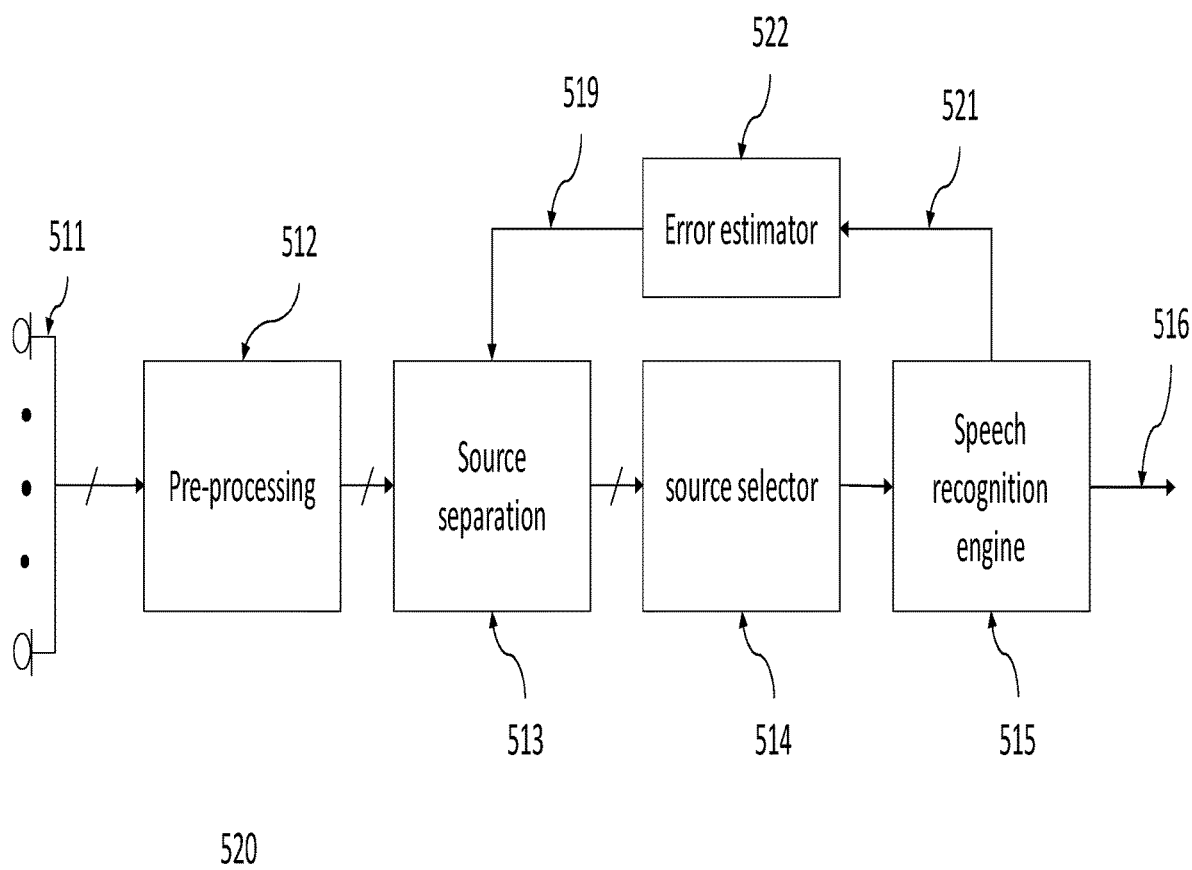
FIG. 7 illustrates an example of a voice recognition chain in real-time training.
Figure 8:
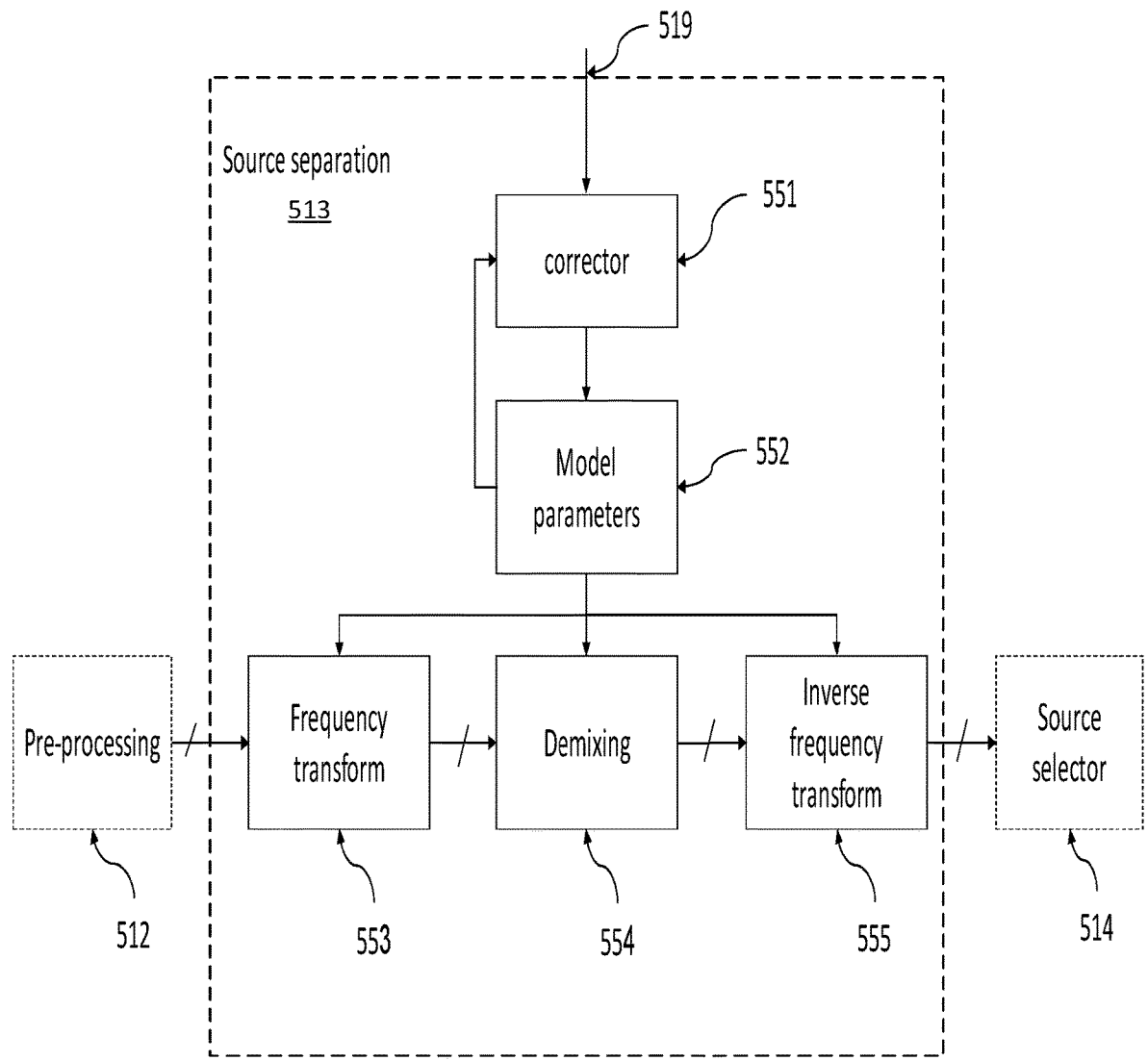
FIG. 8 illustrates an example of a training mechanism.
Figure 9:
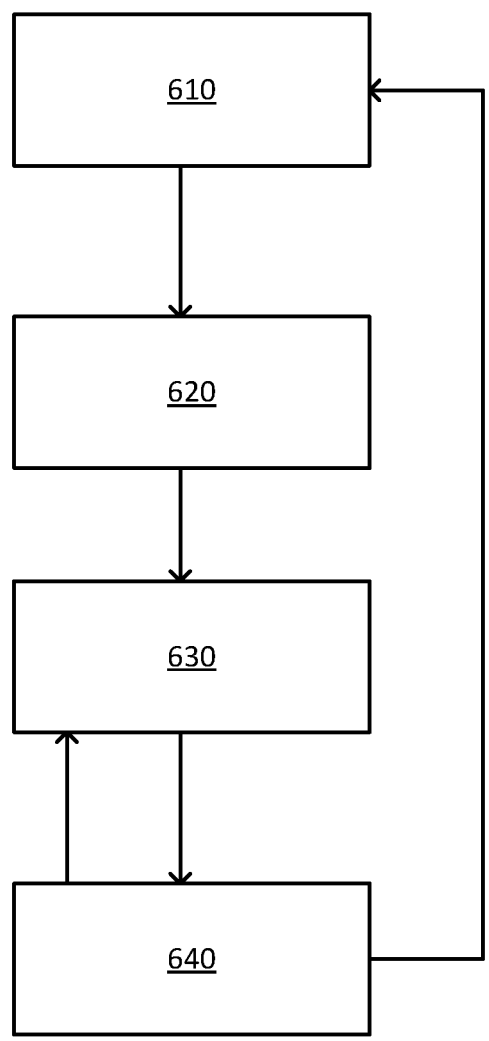
FIG. 9 illustrates an example of a method.

FIG. 7 illustrates an example of a voice recognition chain in real-time training, that is, during the normal operation of the system. During the operation of the VUI the true text that was pronounced by the human speaker is unknown, and a supervised error 519 is unavailable. An alternative is the confidence score 521 which was developed for real-time applications, when there is no reference to the real spoken text, and the application can benefit from knowing the reliability level of the ASR output. For example, when the confidence score is low, a system may go into an appropriate branch in which a more directed dialog is carried on with the user. There are many methods for estimating the confidence score, most of them target a high correlation with the error that can be computed when the spoken text is known. In the real-time training, the confidence score 521 is converted to the supervised error 519 by the error estimator 522. When the confidence score is highly correlated with the theoretical supervised error, the error estimator 522 may be a simple axis conversion. While the confidence score 521 ranges from 0 to 100 where the objective is to get it higher, the supervised error ranges from 0 to 100 and the objective is to get it lower. A simple axis conversion of the form of estimated_error=100−confidence_score may be used as the error estimator 522. The estimated error 519 may be used to train the parameters of the SS likewise the offline training.

FIG. 3 illustrates the training mechanism of a typical SS 513. The source separator (SS) 513 receives a set of mixed signals from the pre-processing stage 512 and feeds the source selector 514 with separated signals. Typically, source separation of acoustic signals, and specifically, speech signals, is done in the frequency domain. The mixed signals from the pre-processing stage 512 are first transformed into the frequency domain 553. This is done by dividing the mixed signals into segments of identical length, with an overlap period between consequent segments. For example, when the length of the segments is determined to be 1024 samples, and the overlap period is 25%, then each of the mixed signals is divided into segments of 1024 samples each. The set of concurrent segments from different mixed signals is termed a batch. Each batch of segments starts 768 samples after the previous batch. Note, that the segments across the set of the mixed signals are synchronized, that is, the start points of all the segments belonging to the same batch are identical. The length of the segments in a batch and the overlap period are taken from the model parameters 552.

A demixing algorithm 554 separates the batch of segments arrived from the frequency transform 553. As many other algorithms, source separation (SS) algorithm includes a set of mathematical models, accompanied with a set of model parameters 552. The mathematical models establish the method of operation, such as the way the SS copes with physical phenomena e.g. multipath. The set of model parameters 552 adjusts the operation of the SS to specific features of the source signals, to the architecture of the automatic speech recognition engines (ASR) which receives these signals, to the geometry of the environment, and even to the human speaker.

The demixed batch of segments is forwarded to the inverse frequency transform 555 in which it is transformed back to the time domain. The same set of model parameters 552 which was used in the frequency transform stage 553 is used in the inverse frequency transform stage 555. For example, the overlap period is used to reconstruct the output signals in the time domain from the consequent batches. This is done for example, using the overlap-add method, in which after the inverse frequency transform, the resulting output signal is reconstructed by overlapping and adding overlapped intervals, possibly with appropriate weighting function that ranges between 0 to 1 across the overlap region, so that the total energy is conserved. In other words, the overlap segment from the former batch fades out while the overlap segment from the latter batch fades in. The output of the Inverse frequency transform block is forwarded to the source selector 514.

The model parameters 552 is a set of parameters which are used by the frequency transform block 553, the demixing block 554 and the inverse frequency transform block 555. The division of the mixed signals into segments of identical length, which is done by the frequency transform 553, is paced by a clocking mechanism such as real-time clock. At each pace, each of the frequency transform block 553, the demixing block 554 and the inverse frequency transform block 555 extract the parameters from the model parameters 552. These parameters are then substituted in the mathematical models which are executed in the frequency transform block 553, the demixing block 554 and the inverse frequency transform block 555.

The corrector 551 optimizes the set of model parameters 552, aiming at reducing the error 519 from the error estimator. The corrector 551 receives the error 519 and the current set of model parameters 552 and outputs a corrected set of model parameters 552. The correction of the set of parameters can be done a-priori (offline) or during the operation of the VUI (real-time). In offline training the error 519, which is used to correct the set of model parameters 552, is extracted using predefined text which is pronounced to the microphones and comparing the output of the ASR to this text. In real time training, the error 519 is extracted from the confidence score of the ASR.

The error is then used to modify the set of parameters to find the values which minimize the error. This can be done by any supervised estimation or optimization method, preferably derivative free methods, such as golden section search, grid search and Nelder-Mead.

The Nelder-Mead method (also downhill simplex method, amoeba method, or polytope method) is a commonly applied numerical method used to find the minimum or maximum of an objective function in a multidimensional space. It is a direct search method (based on function comparison) and is often applied to nonlinear optimization problems for which derivatives may not be known.

Nelder-Mead iteratively finds a local minimum of the error 519 as a function of several parameters. The method starts with a set of values which determines a simplex (a generalized triangle in N dimensions). There is an assumption that a local minimum exists within the simplex. At each iteration the errors at the vertices of the simplex are computed. The vertex with the maximal error is replaced with a new vertex so that the volume of the simplex is reduced. This repeats until the simplex volume is smaller than a predefined volume, and the optimal value is one of the vertices. The process is performed by the corrector 551.

Golden section search finds the minimum of the error 519 by successively narrowing the range of values inside which the minimum is known to exist. The golden section search requires a strictly unimodal error as a function of the parameter. The operation of narrowing the range is done by the corrector 551.

The golden-section search is a technique for finding the extremum (minimum or maximum) of a strictly unimodal function by successively narrowing the range of values inside which the extremum is known to exist. (www.wikipedia.org).

Grid search iterates through a set of values associated with one or more of the parameters to be optimized. When more than one parameter is optimized, each value in the set is a vector whose length is equal to the number of parameters. For each value the error 519 is computed, and the value corresponding to the minimal error is selected. The iteration through the set of values is performed by the corrector 551.

Grid Search—the traditional way of performing hyperparameter optimization has been grid search, or a parameter sweep, which is simply an exhaustive searching through a manually specified subset of the hyperparameter space of a learning algorithm. A grid search algorithm must be guided by some performance metric, typically measured by cross-validation on the training set or evaluation on a held-out validation set. Since the parameter space of a machine learner may include real-valued or unbounded value spaces for certain parameters, manually set bounds and discretization may be necessary before applying grid search. (www.wikipedia.org).

All the optimization methods require successive computation of the error 519 with the same set of separated acoustic signals. This is a time-consuming process, and therefore may not be performed continuously, but only when the error 519 (which is computed continuously) exceeds some predefined threshold, e.g. 10% error. When this happens, two approaches can be taken.

One approach is to operate the optimization in parallel to the normal operation of the system using parallel threads or multi cores. That is, there is one or more parallel tasks which perform blocks 513, 514, 515, 522 in parallel to the task of the normal operation of the system. In the parallel tasks, a batch of mixed signals with length of 1-2 seconds is taken from the pre-processing 512, and repeatedly separated 513 and interpreted 514, 515 with different sets of model parameters 552. The error 519 is computed is computed for each such cycle. At each cycle, the set of model parameters is selected by the corrector 551 according to the optimization method.

Second approach is to operate the optimization when there is no speech in the room. Periods with absence of human speech can be detected using voice activity detection (VAD) algorithms. These periods are used to optimize the model parameters 552 the same way as in the first approach, saving the need for parallel threads or multi cores.

A suitable optimization method should be selected for each parameter in 552. Some of the methods are applied to a single parameter, and some are applied to a group of parameters. The following text suggests several parameters that affect the performance of the speech recognition. Also, optimization methods are suggested based on the characteristic of the parameter.

Length of Segments Parameter.

The length of segment parameter is related to FFT/IFFT. Typically, ASRs which use features of separated phonemes require short segments of the order of 20 mSec, whereas ASRs which use features of series of consequent phonemes use segments of the order of 100-200 mSec. On the other hand, the length of the segment is affected by the scenario, such as the reverberation time of the room. The segment length should be of the order of the reverberation time which may be as much as 200-500 mSec. As there is no sweet point for the length of the segment, this value should be optimized to the scenario and the ASR. Typical value is 100-500 mSec, in terms of samples. For example, sampling rate of 8 kHz, implies segment length of 800-4000 samples. This is a continuous parameter.

The optimization of this parameter can be done using various optimization methods such as a golden section search or Nelder-Mead together with the overlap period. When using the golden section search, the input to the algorithm is the minimum and maximum possible length, for example 10 mSec to 500 mSec, and the error function 519. The output is the length of the segment which minimizes the error function 519. When using Nelder-Mead with the overlap period, the input is a set of three two-tuples of the segment length and the overlap period, for example (10 mSec, 0%), (500 mSec, 10%) and (500 mSec, 80%) and the error function 519, and the output is an optimal length of segment and an optimal overlap period.

Overlap Period

The overlap period parameter is related to FFT/IFFT. The overlap period is used to avoid overlooking of phonemes because of the segmentation. That is, phonemes which are divided between consequent segments. As the length of the segments, the overlap period depends on the features the ASR employs. Typical range—0-90% of the length of the segment. This is a continuous parameter.

The optimization of this parameter can be done using various optimization methods such as a Golden section search or Nelder-mead with the length of segment. When using the golden section search, the input to the algorithm is the minimum and maximum possible overlap period, for example 0% to 90%, and the error function 519. The output is the overlap period which minimizes the error function 519.

Window. The window parameter is related to FFT/IFFT. The frequency transform 553 often uses windowing to alleviate the effect of segmentation. Some windows such as Kaiser and Chebyshev are parameterized. This means that the effect of the window can be controlled by changing the parameter of the window. The typical range depends on the type of the window. This is a continuous parameter. The optimization of this parameter can be done using various optimization methods such as a Golden section search. When using the golden section search, the input to the algorithm is the minimum and maximum values of the parameter of the window, which depend on the window type, and the error function 519. For example, for Kaiser window, the minimum and maximum values are (0,30). The output is an optimal window parameter.

Sampling Rate

The sampling rate parameter is related to FFT/IFFT. Sampling rate is one of the critical parameters which affect the performance of the speech recognition. For example, there are ASRs which demonstrate poor results for sampling rate which is lower than 16 kHz. Other can work well even with 4 or 8 kHz. Typically, this parameter is optimized once when the ASR is selected. The typical range is 4, 8, 16, 44.1, 48 kHz. This parameter is a discrete parameter. The optimization of this parameter can be done using various optimization methods such as a grid search. The input to the algorithm is the values over which the grid search is performed—for example sampling rate of (4, 8, 16, 44.1, 48) kHz, and the error function 519. The output is the optimal sampling rate.

Filtering

The filtering parameter is related to the demixing. Some ASRs use features which represent limited frequency range. Therefore, filtering the separated signals after the source separation 513, may emphasize specific features which are used by the ASR, thereby improving its performance. Moreover, filtering out spectral components which are not used by the ASR may improve the signal to noise ratio (SNR) of the separated signals, which in turn may improve the performance of the ASR. The typical range is 4-8 kHz. The optimization of this parameter can be done using various optimization methods such as a Golden section search. This parameter is continuous. When applying the golden section search the input to the algorithm is the error function 519 and the initial guess of the sections of the cut-off frequency, for example, 1000 Hz and 0.5× sampling rate. The output is the optimal filtering parameter.

Weighting factors for each microphone. The Weighting factors for each microphone is related to demixing. Theoretically, the sensitivity of different microphones on a specific array should be similar up to 3 dB. Practically, however, the span of the sensitivity of different microphones may be greater. Furthermore, the sensitivity of microphones may change in time due to dust and humidity. The typical range is 0-10 dB. This is a continuous parameter. The optimization of this parameter can be done using various optimization methods such as Nelder-mead with or without the Weighting factors for each microphone. When applying the Nelder-mead method the input to the algorithm is the error function 519 and the initial guess of the vertices of the simplex. For example, the size of each n-tuple is the number of microphones—N: (1,0, . . . ,0,0), (0,0, . . . ,0,1) and (1/N, 1/N, . . . ,1/N). The output is the optimal weight per microphone.

Number of Microphones

The Number of microphones is related to demixing. The number of microphones affects the number of sources which can be separated on the one hand, and the complexity and numerical precision on the other hand. Practical experiments also shown that too many microphones may cause a decrease in output SNR. The typical range is 4-8. This is a discrete parameter. The optimization of this parameter can be done using various optimization methods such as a Grid search or Nelder-mead with the Weighting factors for each microphone. When applying a grid search the input to the algorithm is the error function 519 and the number of microphones over which the search is performed. For example, 4,5,6,7,8 microphones. The output is the optimal number of microphones.

FIG. 4 illustrates method 600.

Method 600 may start by step 610 of receiving or calculating an error related to a speech recognition process that was applied on a previous output of a source selection process.

Step 610 may be followed by step 620 of amending at least one parameter of the source separation process based on the error.

Step 620 may be followed by step 630 of receiving signals that represent audio signals that originated from multiple sources and are detected by an array of microphones.

Step 630 may be followed by step 640 of performing a source separation process for separating audio signals that originated from different sources of the multiple sources to provide source separated signals; and sending the source separated signals to the source selection process.

Step 640 may be followed by step 630.

Each one or more iterations of steps 630 and 640 may be followed by step 610 (not shown)—where the output of step 640 may be fed to the source selection process and the ASR to provide the previous output of the ASR.

It should be noted that an initial iteration of steps 630 and 640 may be executed without receiving the error.

Step 640 may include applying a frequency conversion (such as but not limited to FFT), demixing and applying an inverse frequency conversion (such as but not limited to IFFT).

Step 620 may include at least one of the following:
a. Amending at least one parameter of the frequency conversion.
b. Amending at least one parameter of the inverse frequency conversion.
c. Amending at least one parameter of the demixing.
d. Amending a length of a segment of the signals that represent audio signals on which a frequency conversion is applied.
e. Amending an overlap between consecutive segments of the signals that represent audio signals, wherein the frequency conversion is applied on a segment to segment basis.
f. Amending a sampling rate of the frequency conversion.
g. Amending a windowing parameter of a window applied by the frequency conversion.
h. Amending a cut-off frequency of a filter that is applied during the demixing.
i. Amending a weight applied to each microphone out of the array of microphones during the demixing.
j. Amending a number of microphones of the array of microphones.
k. Determining an amended value of at least one parameter using a golden section search.
l. Determining an amended value of at least one parameter using a Nedler Mead algorithm.
m. Determining an amended value of at least one parameter using a grid search.
n. Determining an amended value of a parameter of at least one parameter based on a predefined mapping between the error and the at least one parameter.
o. Determining in real time a mapping between the error and at least one parameter.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

The phrase "may be X" indicates that condition X may be fulfilled. This phrase also suggests that condition X may not be fulfilled. For example—any reference to a system as including a certain component should also cover the scenario in which the system does not include the certain component. For example—any reference to a method as including a certain step should also cover the scenario in which the method does not include the certain component. Yet for another example—any reference to a system that is configured to perform a certain operation should also cover the scenario in which the system is not configured to perform the certain operation.

The terms "including", "comprising", "having", "consisting" and "consisting essentially of" are used in an interchangeable manner. For example—any method may include at least the steps included in the figures and/or in the specification, only the steps included in the figures and/or the specification. The same applies to the system.

The system may include an array of microphones, a memory unit and one or more hardware processors such as digital signals processors, FPGAs, ASICs, a general-purpose processor programmed to execute any of the mentioned above method and the like. The system may not include the array of microphones but may be fed from sound signals generated by the array of microphones.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one as or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc. A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system. The computer system may for instance include at least one processing unit, associated memory and a number of input/output (I/O) devices. When executing the computer program, the computer system processes information according to the computer program and produces resultant output information via I/O devices.

Any system referred to this patent application includes at least one hardware component.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. An apparatus comprising:
an input to receive a plurality of input signals representing an acoustic input;
an output to provide a plurality of output signals configured for an Automatic Speech Recognition (ASR) process at a speech recognition engine; and
a source separator configured to generate the plurality of output signals based on the plurality of input signals and an error input, the error input based on feedback from the speech recognition engine, the error input representing an error of the speech recognition engine based on a plurality of previous output signals generated by the source separator and provided from the output to the speech recognition engine, wherein the source separator is configured to generate the plurality of output signals by processing the plurality of input signals to separate the acoustic input into a plurality of source-separated acoustic signals corresponding to a plurality of acoustic sources, respectively.

2. The apparatus of claim 1, wherein the source separator is configured to process the plurality of input signals according to at least one source separation parameter, wherein the source separator is configured to determine the at least one source separation parameter based on the error input.

3. The apparatus of claim 2, wherein the source separator is configured to:
determine a first plurality of output signals based on a first setting of the at least one source separation parameter;
determine a second setting of the at least one source separation parameter based on an error input corresponding to the first plurality of output signals, wherein the error input corresponding to the first plurality of output signals represents an error of the speech recognition engine based on the first plurality of output signals, wherein the second setting of the at least one source separation parameter is different from the first setting of the at least one source separation parameter; and
determine a second plurality of output signals based on the second setting of the at least one source separation parameter.

4. The apparatus of claim 3, wherein the source separator is configured to:
determine a third setting of the at least one source separation parameter based on an error input corresponding to the second plurality of output signals, wherein the error input corresponding to the second plurality of output signals represents an error of the speech recognition engine based on the second plurality of output signals, wherein the error input corresponding to the second plurality of output signals is different from the error input corresponding to the first plurality of output signals, wherein the third setting of the at least one source separation parameter is different from the second setting of the at least one source separation parameter; and
determine a third plurality of output signals based on the third setting of the at least one source separation parameter.

5. The apparatus of claim 2, wherein the source separator is configured to update the at least one source separation parameter based on a change in the error input.

6. The apparatus of claim 5, wherein the source separator is configured to update the at least one source separation parameter in real time, based on a real-time change of the error input.

7. The apparatus of claim 5, wherein the source separator is configured to update the at least one source separation parameter according to at least one of a golden section search, a Nedler Mead algorithm, or a grid search.

8. The apparatus of claim 2 comprising a memory to store the at least one source separation parameter.

9. The apparatus of claim 1, wherein the source separator is configured to:
perform a frequency conversion to convert the plurality of input signals into a plurality of sample segments in a frequency domain;
apply a demixing operation to the plurality of sample segments to provide a plurality of demixed segments according to a source separation model; and
perform an inverse frequency conversion to convert the plurality of demixed segments from the frequency domain into a time domain.

10. The apparatus of claim 9, wherein the source separator is configured to determine at least one source separation parameter based on the error input, wherein the at least one source separation parameter comprises at least one of a frequency conversion parameter of the frequency conversion, a demixing parameter of the demixing operation, or an inverse frequency conversion parameter of the inverse frequency conversion.

11. The apparatus of claim 9, wherein the source separator is configured to determine at least one frequency conversion parameter of the frequency conversion based on the error input.

12. The apparatus of claim 11, wherein the at least one frequency conversion parameter comprises at least one of a segment length of the frequency conversion, a segment overlap of the frequency conversion, a sampling rate of the frequency conversion, or a window parameter of the frequency conversion.

13. The apparatus of claim 9, wherein the source separator is configured to determine at least one demixing parameter of the demixing operation based on the error input.

14. The apparatus of claim 13, wherein the at least one demixing parameter comprises at least one of a filter cut-off frequency, a microphone weight, or a number of microphones.

15. The apparatus of claim 1 comprising an error estimator configured to generate the error input based on the feedback from the speech recognition engine.

16. The apparatus of claim 15, wherein the feedback from the speech recognition engine comprises an output text of the ASR process, the error estimator is configured to generate the error input based on a comparison between the output text of the ASR process and a reference text.

17. The apparatus of claim 15, wherein the feedback from the speech recognition engine comprises a confidence score representing a reliability level of an output text of the ASR process.

18. The apparatus of claim 1, wherein the plurality of input signals represent signals from a plurality of microphones.

19. The apparatus of claim 1 comprising an ASR processor comprising the speech recognition engine, the ASR processor configured to output recognized text based on the plurality of output signals from the source separator.

20. A non-transitory computer readable medium that stores instructions that once executed by a computerized system cause the computerized system to:
    process, based on an error input, a plurality of input signals representing an acoustic input to separate the acoustic input into a plurality of source-separated acoustic signals corresponding to a plurality of acoustic sources, respectively, wherein the error input is based on feedback from a speech recognition engine, the error input representing an error of the speech recognition engine based on a plurality of previous output signals provided for an Automatic Speech Recognition (ASR) process at the speech recognition engine; and
    provide a plurality of output signals configured for the ASR process at the speech recognition engine, the plurality of output signals representing the plurality of source-separated acoustic signals, respectively.

21. The non-transitory computer readable medium of claim 20, wherein the instructions, when executed, cause the computerized system to determine at least one source separation parameter based on the error input, and to process the plurality of input signals according to the at least one source separation parameter.

22. A system comprising:
    a plurality of microphones;
    a memory;
    a speech recognition engine to recognize speech according to an Automatic Speech Recognition (ASR) process; and
    a processor configured to process a plurality of input signals based on an error input, the plurality of input signals representing an acoustic input from the plurality of microphones, and to provide a plurality of output signals configured for the Automatic Speech Recognition (ASR) process at the speech recognition engine,
    wherein the error input is based on feedback from the speech recognition engine, the error input representing an error of the speech recognition engine based on a plurality of previous output signals generated by the processor and provided to the speech recognition engine,
    wherein the processor is configured to generate the plurality of output signals by processing the plurality of input signals to separate the acoustic input into a plurality of source-separated acoustic signals corresponding to a plurality of acoustic sources, respectively, wherein the plurality of output signals represent the plurality of source-separated acoustic signals, respectively.

23. The system of claim 22, wherein the processor is configured to process the plurality of input signals according to at least one source separation parameter, wherein the processor configured to determine the at least one source separation parameter based on the error input.

* * * * *